H. C. SMITH.
STOP MECHANISM.
APPLICATION FILED NOV. 17, 1919.
1,372,913.
Patented Mar. 29, 1921.
2 SHEETS—SHEET 1.
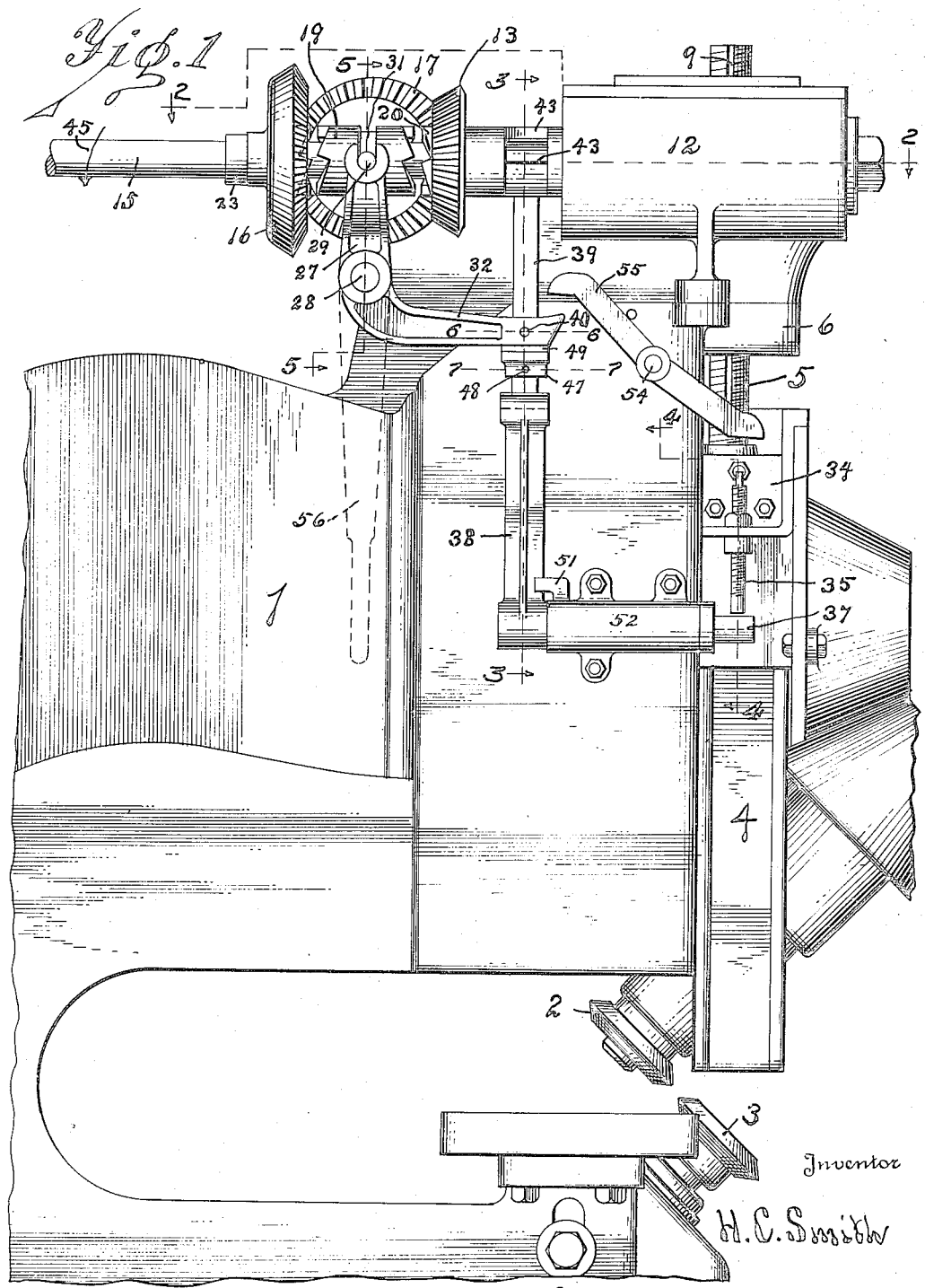
Inventor
H. C. Smith
By Edward N. Pagelsen
Attorney H. C. SMITH.
STOP MECHANISM.
APPLICATION FILED NOV. 17, 1919.
1,372,913.
Patented Mar. 29, 1921.
3 SHEETS—SHEET 2.
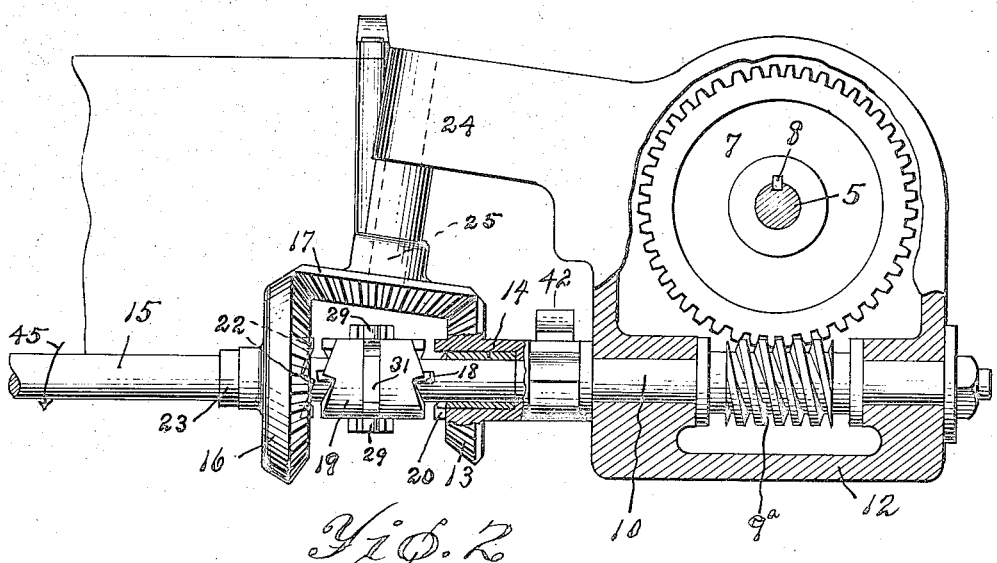
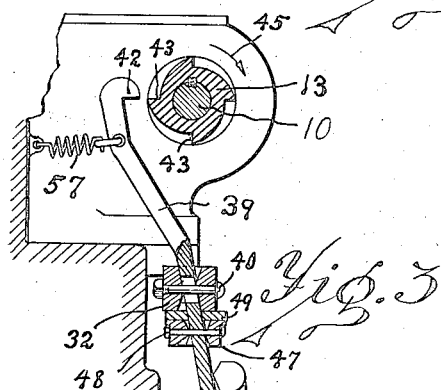
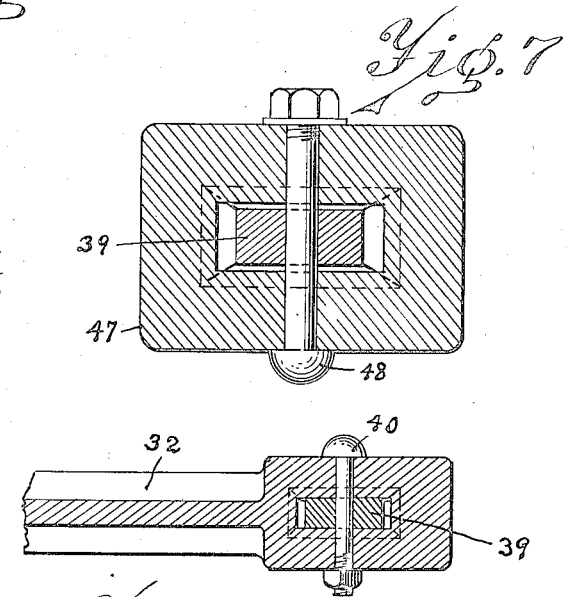
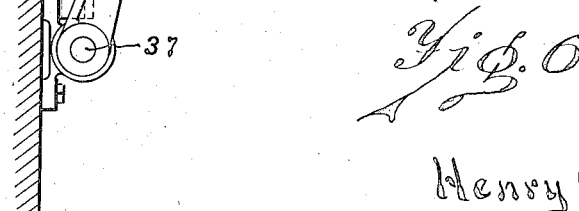
Inventor
Henry Cobb Smith
By Edward N. Pagelsen
Attorney

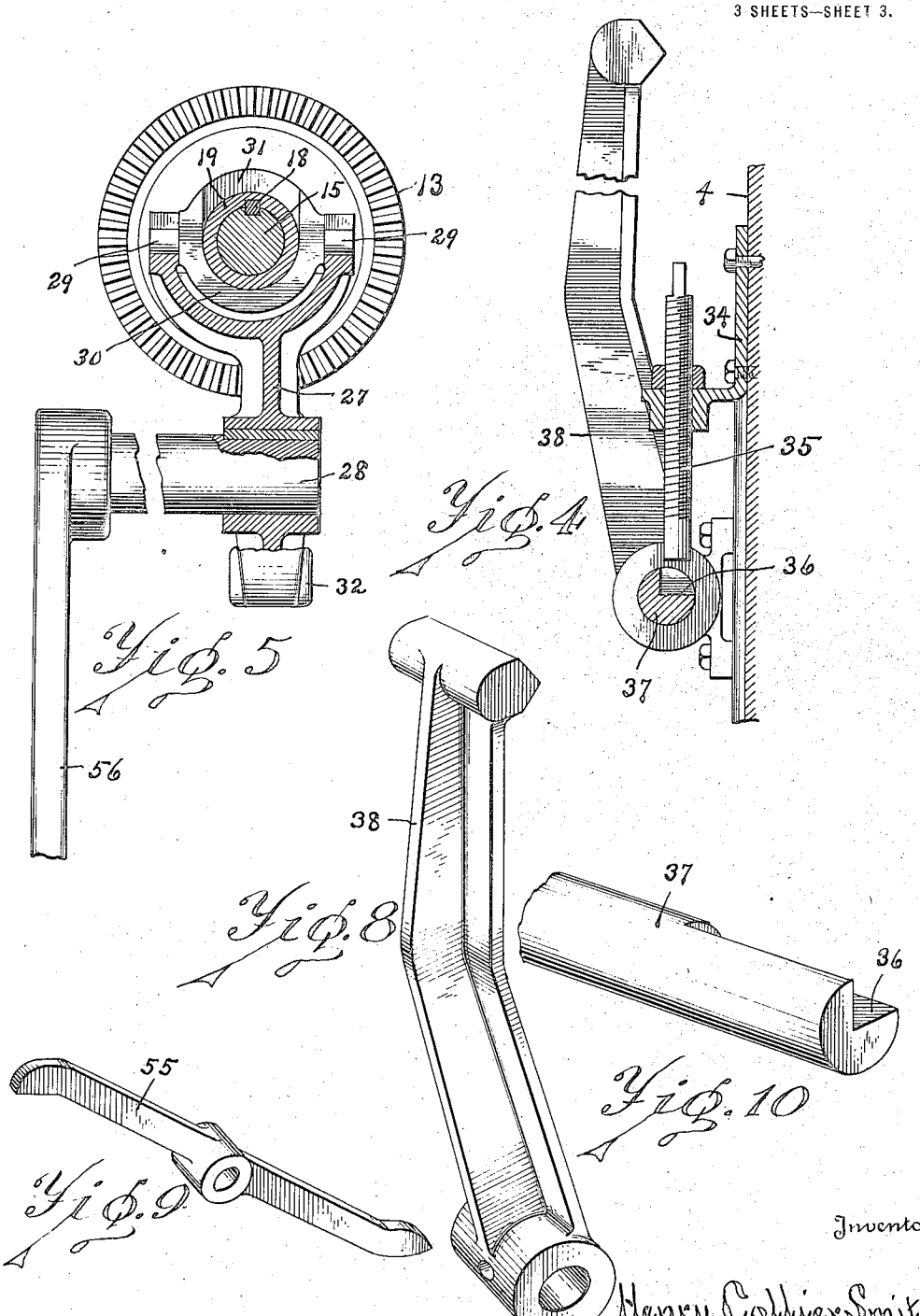

UNITED STATES PATENT OFFICE.

HENRY COLLIER SMITH, OF ST. MARYS, OHIO.

STOP MECHANISM.

1,372,913. Specification of Letters Patent. Patented Mar. 29, 1921.

Application filed November 17, 1919. Serial No. 338,633.

*To all whom it may concern:*

Be it known that I, HENRY COLLIER SMITH, a citizen of the United States, and residing at St. Marys, in the county of Auglaize and State of Ohio, have invented a new and improved Stop Mechanism, of which the following is a specification.

This invention relates to means for disengaging the clutch mechanism employed to drive heavy slow moving machines, particularly the clutches which move the heads of rotary shears up and down, and its object is to provide a stop mechanism which can be set to operate within very small limits, which will be positive in its operation, and which may be installed at moderate cost.

This invention consists in a pair of alined driving and driven shafts, a slidable clutch member on the driving shaft and a second clutch member secured to the driven shaft to cause one shaft to drive the other when the clutch members engage, a lever to slide the clutch, a ribbed hub on the driven shaft and a hook connected to said lever and adapted to engage a rib on said hub whereby said rib will actuate the lever to move the clutch to free the driven shaft, and means to cause the hook to engage the hub. It also consists in the use of an adjustable screw and a lever swung thereby to swing the hook into engagement with the hub. It further consists in the details of construction illustrated in the accompanying drawings and particularly pointed out in the claims.

In the accompanying drawings, Figure 1 is a side elevation of a portion of the frame of a rotary shear with my improved stop mechanism connected to the positioning device for the head. Figs. 2 to 7 inclusive are sections on the lines 2—2, 3—3, 4—4, 5—5, 6—6 and 7—7 respectively of Fig. 1. Figs. 8, 9 and 10 are perspective views of the trip lever, stop lever for the reverse feed and trip shaft, respectively.

Similar reference characters refer to like parts throughout the several views.

The frame 1 of the shear shown in Fig. 1 is substantially that shown in my prior Patent No. 1,313,960, dated August 26, 1919, and the machine embodies the rotary cutters 2 and 3, the former mounted on the vertically movable head 4 which may be moved up and down by means of the screw 5 rotatable in a nut 6 on the frame; which screw is connected to a worm wheel 7 at its upper end by means of a feather 8 slidable in the groove 9 in the screw. When a sheet of metal is to be cut it is often necessary to start cutting a distance from the edges of the sheet and to do this, the upper and lower cutters are forced toward each other until the sheet is pierced by the cutters sufficiently to sever the metal. The present mechanism is designed to drive the screw 5 until the cutters pierce the sheet and then disengage the driving mechanism of the screw. It is apparent that when the two cutters are embedded in a thick sheet it is difficult to determine the exact distance between the cutters. The present mechanism is so constructed that this positioning may be predetermined to within a very small fraction of an inch.

The worm $9^a$ is mounted on a shaft 10 journaled in a case 12 and having a driving bevel gear 13 at its rear end. A bushing 14 in this gear acts as a bearing for the forward end of the constantly running shaft 15 which may be driven in any desired manner. Loose on this shaft is a bevel gear 16 which meshes with the idler gear 17 which idler also meshes with the bevel gear 13 so that the three gears will always turn together.

Slidable on this shaft 15 and caused to rotate therewith by means of a spline 18 is a clutch sleeve 19 having teeth at both ends. The teeth at the forward end of this sleeve are adapted to mesh with the teeth 20 on the bevel gear 13, while the teeth at the rear end of the sleeve are adapted to mesh with the teeth 22 on the gear 16 which is freely rotatable on the shaft 15 but is kept from movement thereon by means of a collar 23. Mounted in a bracket 24 is a transverse shaft 25 on which the idler gear 17 is rotatable. When the sleeve 19 is moved rearwardly until its rear teeth engage with the teeth 22 on the gear 16, so that this sleeve 19 may drive the gear 18, such driving will transmit power through the gears 16 and 17 to the gear 13 and drive it in the direction opposite to that which it would be driven if the clutch 19 were moved forward into engagement with this bevel gear 13. It will, therefore, be seen that when the sleeve 19 is moved forward the worm will turn the screw 5 to the right and force the head 4 down, while when the sleeve 19 is caused to engage the gear 16 the shaft 10 will be turned in the opposite direction and the screw 5 will be turned to the left in order to lift the head 4 and the rotary cutter 2. The mechanism to be described is intended to disengage this clutch sleeve 19 from the gears 13 and 16 when the head has reached the limits of its movement in either the downward or upward directions.

The clutch lever 27 is mounted on a shaft 28 which is rotatable in proper bearings carried by the frame 1 of the machine and the upper end of this lever 27 is forked to receive pins 29 on a stirrup 30 that fits in a groove 31 in the sleeve 19. Vertical movement of the arm 32 of this lever will disengage the sleeve 17 from the pinion 13 and further movement will cause it to engage with the gear 16.

Mounted on a small bracket 34 which is secured to the head 4 is a knock-out screw 35 which may be positioned to control the movement of the head 4. The lower end of this screw 35 is adapted to engage the surface 36 formed on the knock-out shaft 37 and turn the same, and in so doing swing the knock-out lever 38 inward toward the machine. When this lever 38 swings inward in this manner it strikes the lower end of a latch lever 39 which is pivoted on the pin 40 carried by the arm 32 of the clutch lever 27. The upper end of this latch lever is provided with a hook 42 which extends toward the hub of the gear 13, which hub is formed with ribs 43. If now the knock-out screw 35 strikes the lip 36 on the shaft 37 and swings the knock-out lever 38 against the latch lever 39, the upper hooked end of the latch lever will be swung into the path of the rib 43 on the hub of the pinion 13 which is turning in the direction of the arrows 45, and this will result in the latch lever 39 lifting the arm 32 of the clutch lever 27 and in disengaging the teeth at the front end of the sleeve 19 from the clutch teeth on the pinion 13. It will be apparent that forming these ribs on the hub of the gear 13 is merely a matter of convenience and that projections of any other character may be employed so long as they are connected to the driven shaft 10. As all of these movements are absolutely positive, and as the downward movement of the knock-out screw 35 necessary to turn this knock-out shaft 37 and swing the knock-out lever 38 is extremely small, the accuracy of this stop mechanism is great. In fact, the position of the cutter 2 can be regulated to within one sixty-fourth of an inch.

In order to relieve the pin 40 of the load put upon the arm 32 of the clutch lever by the latch lever 39, I prefer to pin a collar 47 to this latch lever by means of a pin 48 and between this collar and the arm 32 I prefer to place a pad 49, preferably of leather, so as to cushion the blow between the ribs 43 and the hook 42 on the latch lever.

As soon as the clutch teeth on the sleeve 19 and on the gear 13 disengage, the worm 9ª stops turning and the head 4 cannot be forced down any farther without the use of tools. The hook 42 will usually remain in engagement with the rib 43 until the worm 9ª is turned in the opposite direction and the pressure between the hook and rib relieved when the hook will be disengaged by the spring 57 which is attached to the frame of the machine. This spring normally holds back this hook and so avoids the danger of improper engagement with the ribs 43.

In order to limit the outward swing of the knock-out lever 38, I prefer to place a finger 51 on the bearing 52 of the knock-out shaft 37 as shown in Fig. 1.

The upward movement of the head need not be limited within as close a range as the downward movement. I have mounted a pin 54 on the frame 1 and a lever 55 is mounted on this pin. The forward end of this lever may be engaged by any desired mechanism mounted on the head 4, such as the upper end of the knock-out pin 35 and the rear end of this lever may be thereby swung down to engage the outer end of the arm 32 of the clutch lever. The result is that when the head 4 begins to reach the upper limit of its movement, the pin 35 will begin to swing the stop lever 55 to the left, which will cause the clutch lever to move the clutch sleeve 19 forward until the teeth at the rear end thereof disengage the teeth on the gear 16.

The mechanism thus far described is intended to stop the movement of the head 4 in either the downward or upward direction. In order to start the screw 5 turning to move the head up or down, a lever 56 is secured to the shaft 28 on the opposite side of the machine from the mechanism just described. When this lever 56 is swung forward the clutch sleeve will engage the gear 16 and cause the head to be lifted, the hook 42 disengaging the rib 43 at the beginning of the reverse movement of the shaft 10, while when the lever is swung rearward the opposite effect on the head will be produced and the head will be moved down by the screw 5. The inclination of the engaging surfaces of the teeth on the clutch sleeve 19 and on the gears 13 and 16 is such that they may be disengaged by means of the lever 56 at any time the operator desires.

The details and proportions of the various parts may be varied by skilled engineers without departing from the spirit of my invention as set forth in the following claims.

I claim:—

1. In a stop mechanism the combination of driving and driven elements and a clutch connecting the same, a movable head and means for actuating the same connected to said driven element, a clutch-control lever, a projecting member on the driven element, a latch lever mounted on the clutch-control lever and adapted to engage said projection and be actuated thereby to cause the clutch lever to change the clutch, and means mounted on the movable head to move the latch lever into engagement with said projecting member on the driven element.

2. In a stop mechanism, the combination of alined driving and driven shafts and a clutch connecting the shafts, a head and means connected to the driven shaft for moving the head, a clutch-control lever, a ribbed hub on the driven shaft, a latch lever connected to the clutch lever and adapted to engage the ribbed hub and be lifted to swing the clutch lever to disengage the clutch, and adjustable means mounted on the head to move the latch lever in engagement with said ribbed hub.

3. In a stop mechanism, the combination of a driven shaft, a clutch for driving the shaft, a member actuated by the driven shaft, a clutch control lever, a projection on the driven shaft, and means connected to the clutch control lever and caused to move into the path of the projection on the driven shaft by said shaft actuated member when it has reached the predetermined limit of its movement whereby the projection on said driven shaft will swing the clutch control lever to place the clutch in inoperative position.

4. In a stop mechanism, the combination of a vertically slidable head, a screw to control the movement of the head, a worm-wheel on the screw, a shaft and a worm thereon for actuating said worm wheel and screw, a driving shaft and a clutch for connecting said shafts, a clutch lever, a latch lever connected to the clutch lever, a hub on the worm shaft having projections adapted to be engaged by the latch lever, and means actuated by the head when at the predetermined limit of its movement to cause the latch lever to engage a projection on said hub to be lifted thereby and shift the clutch lever and clutch to disengage the shafts.

5. In a stop mechanism, the combination of a vertically slidable head, a screw to control the movement of the head, a worm-wheel on the screw, a shaft and a worm thereon for actuating said worm wheel and screw, a driving shaft and a clutch for connecting said shafts, a clutch lever, a latch lever connected to the clutch lever, a hub on the worm shaft having projections adapted to be engaged by the latch lever, and means actuated by the head when at the predetermined limit of its movement to cause the latch lever to engage a projection on said hub to be lifted thereby and shift the clutch lever and clutch to disengage the shafts, said means comprising an adjustable screw and a shaft adapted to be turned thereby and a lever on said shaft adapted to be swung against the latch lever to move it into engagement with the projections on said hub.

6. In a stop mechanism, the combination of alined driving and driven shafts, a gear loose on the driving shaft, a second gear fixed to the driven shaft and an idler gear connecting said gears, a clutch sleeve on the driving shaft adapted to connect to the gear on either shaft, a clutch lever pivoted intermediate its ends and having one arm engaging the clutch sleeve and a second arm extending substantially parallel to the shafts, a hub on the driven shaft and provided with a projection, a latch lever connected to the second arm of the clutch lever and having a hook adapted to engage a projection on said hub and be moved thereby to swing the clutch lever to disengage the clutch, and means to cause the latch lever to engage said hub.

7. In a stop mechanism, the combination of alined driving and driven shafts, a gear loose on the driving shaft, a second gear fixed to the driven shaft and an idler gear connecting said gears, a clutch sleeve on the driving shaft adapted to connect to the gear on either shaft, a clutch lever pivoted intermediate its ends and having one arm engaging the clutch sleeve and a second arm extending substantially parallel to the shafts, a hub on the driven shaft and provided with a projection, a latch lever connected to the second arm of the clutch lever and having a hook adapted to engage a projection on said hub and be moved thereby to swing the clutch lever to disengage the clutch, and means to cause the latch lever to engage said hub, said means comprising an adjustable knock-out screw mounted on a head which is operatively connected to said driven shaft, a knock-out shaft and a knock-out arm mounted on said shaft and movable by the knock-out screw to cause the latch lever to engage said hub.

8. In a stop mechanism, the combination of alined driving and driven shafts, a gear loose on the driving shaft, a second gear fixed to the driven shaft and an idler gear connecting said gears, a clutch sleeve on the driving shaft adapted to connect to the gear on either shaft, a clutch lever pivoted intermediate its ends and having one arm engaging the clutch sleeve and a second arm extending substantially parallel to the shafts, a hub on the driven shaft and provided with a projection, a latch lever connected to the second arm of the clutch lever and having a hook adapted to engage a projection on said hub and be moved thereby to swing the clutch lever to disengage the clutch, a hand operated lever connected to said clutch lever and adapted to move the clutch into engagement with the gear on either shaft, means to cause the latch lever to engage said hub to cause the clutch sleeve to disengage the gear on the driven shaft, and independent means to cause the clutch sleeve to disengage the gear on the driving shaft.

9. In a stop mechanism, the combination of alined driving and driven shafts and a clutch connecting the shafts, a head and means connected to the driven shaft for moving the head, a clutch control lever, a projection on the driven shaft, and a latch lever connected to the clutch lever and adapted to engage said projection and be lifted thereby to swing the clutch lever to disengage the clutch.

10. In a stop mechanism, the combination of alined driving and driven shafts and a clutch connecting the shafts, a head and means connected to the driven shaft for moving the head, a clutch control lever, a projection on the driven shaft, a latch lever connected to the clutch lever and adapted to engage said projection and be lifted thereby to swing the clutch lever to disengage the clutch, and adjustable means mounted on the head to move the latch lever into engagement with said projection.

HENRY COLLIER SMITH.